(12) United States Patent
Hudgens et al.

(10) Patent No.: US 10,934,923 B2
(45) Date of Patent: Mar. 2, 2021

(54) HEAT SHIELD ASSEMBLY FOR SHIELDING A WIRE HARNESS

(71) Applicant: Caterpillar Inc., Deerfield, IL (US)

(72) Inventors: Jason W. Hudgens, Washington, IL (US); Scott M Peters, Edwards, IL (US); Ryan W. Rieboldt, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 84 days.

(21) Appl. No.: 16/243,274

(22) Filed: Jan. 9, 2019

(65) Prior Publication Data
US 2020/0217236 A1 Jul. 9, 2020

(51) Int. Cl.
*F01N 13/00* (2010.01)
*H01B 7/00* (2006.01)
*H01B 7/29* (2006.01)

(52) U.S. Cl.
CPC ......... *F01N 13/008* (2013.01); *H01B 7/0045* (2013.01); *H01B 7/29* (2013.01); *F01N 2560/02* (2013.01)

(58) Field of Classification Search
CPC ..... F01N 13/008; F01N 2560/02; H01B 7/29; H01B 7/0045
See application file for complete search history.

(56) References Cited

U.S. PATENT DOCUMENTS

| 4,033,170 | A | * | 7/1977 | Kawamura | F02D 41/1494 |
| | | | | | 73/23.31 |
| 4,597,850 | A | * | 7/1986 | Takahasi | G01N 27/4077 |
| | | | | | 204/426 |
| 5,832,723 | A | * | 11/1998 | Iwata | F01N 13/008 |
| | | | | | 60/276 |
| 10,294,877 | B2 | * | 5/2019 | Arima | F02D 35/0015 |
| 10,539,061 | B2 | * | 1/2020 | Sasaki | F01N 3/24 |
| 2008/0229821 | A1 | * | 9/2008 | Reeder | F01N 13/008 |
| | | | | | 73/431 |
| 2011/0126612 | A1 | * | 6/2011 | Shimizu | G01N 27/12 |
| | | | | | 73/31.05 |

(Continued)

FOREIGN PATENT DOCUMENTS

CN 104847468 A * 8/2015
DE 102010060071 5/2012

(Continued)

*Primary Examiner* — Matthew T Largi
(74) *Attorney, Agent, or Firm* — Oblon, McClelland, Maier & Neustadt

(57) ABSTRACT

A heat shield assembly is provided for shielding a wire harness that is associated with a sensor in communication with a heat source. The heat shield assembly includes a base plate having a primary aperture that is configured to allow passage of the wire harness therethrough. The primary aperture is disposed in alignment with a hole defined on a shroud of the heat source. The heat shield assembly also includes a pair of walls extending upwardly from a pair of opposite edges of the base plate. Further, the heat shield assembly also includes a pair of ledge members that extend laterally from a pair of first ends associated with the pair of walls. Furthermore, the heat shield assembly also includes a pair of thermal diverter plates that extend angularly from a pair of second ends associated with the pair of ledge members.

20 Claims, 4 Drawing Sheets

(56) References Cited

U.S. PATENT DOCUMENTS

| | | | |
|---|---|---|---|
| 2014/0311212 A1* | 10/2014 | Boyd | G01N 27/4078 73/23.2 |
| 2015/0300233 A1* | 10/2015 | Bowers | F01N 13/008 60/320 |
| 2018/0051618 A1* | 2/2018 | Tylutki | G01D 11/245 |

FOREIGN PATENT DOCUMENTS

| EP | 2489847 A * | 8/2012 |
|---|---|---|
| EP | 2923872 | 9/2015 |
| GB | 2471998 | 1/2011 |
| JP | 04061207 | 3/2008 |
| JP | 04520867 | 8/2010 |

\* cited by examiner

HEAT SHIELD ASSEMBLY FOR SHIELDING A WIRE HARNESS

TECHNICAL FIELD

The present disclosure relates to a heat shield assembly. More particularly, the present disclosure relates to a heat shield assembly for shielding a wire harness.

BACKGROUND

Sensors are typically provided with a cable containing one or more wires to communicate power and/or data between the sensors and a controller. When such sensors are mounted onto exhaust conduits of engines, the cables associated with these sensors may also be subject to heat from hot exhaust gases flowing through the exhaust conduits. Although the sensor may be designed to withstand the high temperatures associated with the heat of the exhaust, a sheathing of the cables may deteriorate when exposed to the heat thus exposing one or more wires. To overcome this issue, in some cases, a thermally insulative harness may be additionally provided around the sheathing of such cables. However, with prolonged exposure to heat, the harness and/or the sheathing of the cables could deteriorate and hence fail leading to a failure of communication of power and/or data between the sensor and the controller.

U.S. Publication 2018/0051618 (hereinafter referred to as "the '618 Publication") discloses a heat shield for a gas sensor. The heat shield comprises at least one wall having a top edge and a bottom edge in which the wall is configured to form a body of the heat shield. A base is connected proximate the wall bottom edge defining a bottom diameter. The base includes an aperture capable of receiving the gas sensor, and a circumferential lip proximate the wall top edge that extends radially outward to define an outer lip diameter. In the heat shield of the '618 Publication, the at least one wall is tapered radially outward at an angle of about 3 degrees to about 17 degrees, and the ratio of the outer lip diameter to bottom diameter is at least about 5:3.5. However, by tapering a portion of the at least one wall, or stated differently, an intermediate wall or an intermediate portion of the at least one wall radially outward i.e., at an angle to the direction of flow of heat radiated by the exhaust conduit, it is envisioned that an obstruction may be provided to the flow of heat thereby reducing the effectiveness in diverting the heat away from the sensor. Instead, the heat may be conducted by the tapered portion of the at least one wall of the heat shield of the '618 Publication, thus making at least the cable harness of the sensor susceptible to failure.

Hence, there is a need for a heat shield assembly that effectively diverts heat away from a wire harness of the sensor for overcoming the aforementioned drawbacks.

SUMMARY OF THE DISCLOSURE

In an aspect of this disclosure, a heat shield assembly is provided for shielding a wire harness that is associated with a sensor in communication with a heat source. The heat shield assembly includes a base plate having a primary aperture that is configured to allow passage of the wire harness therethrough. The primary aperture is disposed in alignment with a hole defined on a shroud of the heat source. The heat shield assembly also includes a pair of walls extending upwardly from a pair of opposite edges of the base plate. Further, the heat shield assembly also includes a pair of ledge members that extend laterally from a pair of first ends associated with the pair of walls. Furthermore, the heat shield assembly also includes a pair of thermal diverter plates that extend angularly from a pair of second ends associated with the pair of ledge members.

In another aspect of the present disclosure, an exhaust sensor assembly is provided for an engine. The exhaust sensor assembly includes a sensor, a wire harness associated with and extending from the sensor, and a heat shield assembly disposed about the wire harness. The sensor is received within a passageway of an exhaust conduit associated with the engine via a hole defined on a shroud of the exhaust conduit. The sensor is disposed in communication with the passageway. The wire harness is disposed outwardly from the shroud of the exhaust conduit. The heat shield assembly includes a base plate that has a primary aperture configured for allowing passage of the wire harness therethrough. The primary aperture is disposed in alignment with the hole defined on the shroud of the exhaust conduit. A width of the base plate is in the range of 0.75 to 1.25 times a width of the hole defined on the shroud of the exhaust conduit. The heat shield assembly also includes a pair of walls extending upwardly from a pair of opposite edges of the base plate. Further, the heat shield assembly also includes a pair of ledge members that extend laterally from a pair of first ends associated with the pair of walls. Furthermore, the heat shield assembly also includes a pair of thermal diverter plates that extend angularly from a pair of second ends associated with the pair of ledge members.

In yet another aspect of the present disclosure, an engine includes an exhaust conduit defining a passageway therethrough, and an exhaust sensor assembly associated with the exhaust conduit. The exhaust sensor assembly includes a sensor, a wire harness associated with and extending from the sensor, and a heat shield assembly disposed about the wire harness. The sensor is received within a passageway of an exhaust conduit associated with the engine via a hole defined on a shroud of the exhaust conduit. The sensor is disposed in communication with the passageway. The wire harness is disposed outwardly from the shroud of the exhaust conduit. The heat shield assembly includes a base plate that has a primary aperture configured for allowing passage of the wire harness therethrough. The primary aperture is disposed in alignment with the hole defined on the shroud of the exhaust conduit. A width of the base plate is in the range of 0.75 to 1.25 times a width of the hole defined on the shroud of the exhaust conduit. The heat shield assembly also includes a pair of walls extending upwardly from a pair of opposite edges of the base plate. Further, the heat shield assembly also includes a pair of ledge members that extend laterally from a pair of first ends associated with the pair of walls. Furthermore, the heat shield assembly also includes a pair of thermal diverter plates that extend angularly from a pair of second ends associated with the pair of ledge members.

Other features and aspects of this disclosure will be apparent from the following description and the accompanying drawings.

DETAILED DESCRIPTION

Figure 1:
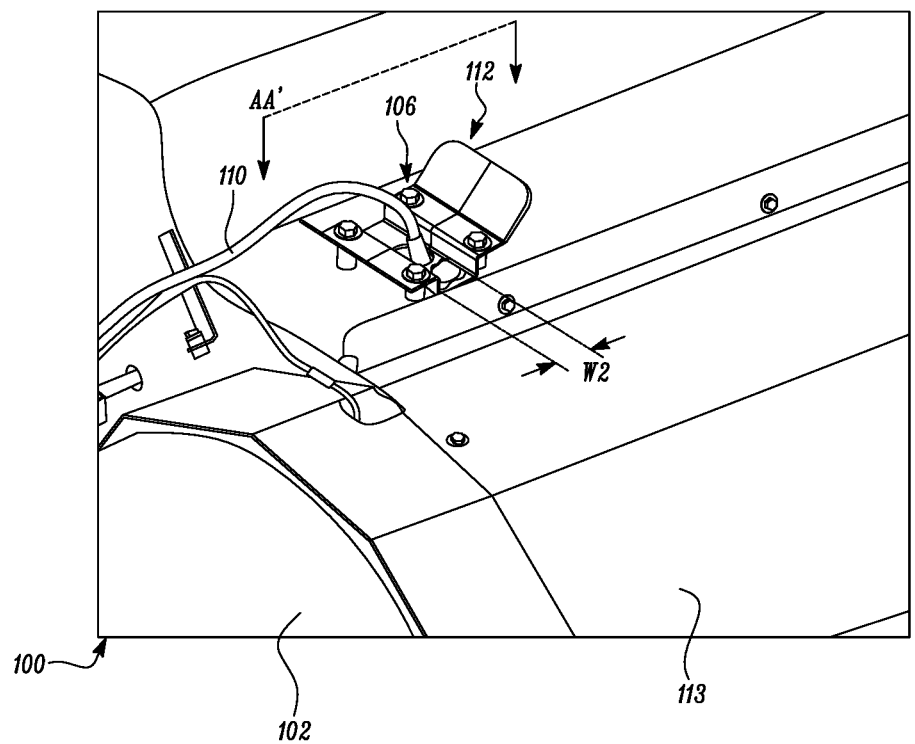
FIG. 1 is a schematic top perspective view of an exemplary engine showing an exhaust conduit and an exhaust sensor assembly having a heat shield assembly in accordance with an embodiment of the present disclosure.

Reference will now be made in detail to specific embodiments or features, examples of which are illustrated in the accompanying drawings. Reference numerals appearing in more than one figure indicate the same or corresponding parts in each of them. References to elements in the singular may also be construed to relate to the plural and vice-versa without limiting the scope of the disclosure to the exact number or type of such elements unless set forth explicitly in the appended claims.

Referring to FIG. 1, an exemplary engine 100 is illustrated. In an embodiment herein, the engine 100 may be an internal combustion engine. In an embodiment, the engine 100 may be embodied as a compression ignited engine, for example, a diesel engine. However, in other embodiments, the engine 100 may be a spark-ignited engine, for example, a direct injection gasoline fueled engine, a gas fueled engine with direct injection of gas, or a dual fuel engine system in which at least one of a pilot fuel and a main fuel are directly injected into a combustion chamber (not shown) of the engine.

Further, the engine 100 disclosed herein may be embodied as a multi-cylinder engine, for example, a four-cylinder engine. Although a multi-cylinder engine is disclosed herein, in other embodiments, the engine 100 could be embodied to include fewer or more cylinders than that disclosed herein. For example, a single-cylinder engine may be employed in lieu of a multi-cylinder engine to form the engine 100 disclosed herein. A type of engine used to form the engine 100 is merely exemplary and hence, non-limiting of the present disclosure. Therefore, it will be appreciated by persons skilled in the art that embodiments of the present disclosure are applicable to any type of engine without deviating from a spirit of the present disclosure.

Figure 2:
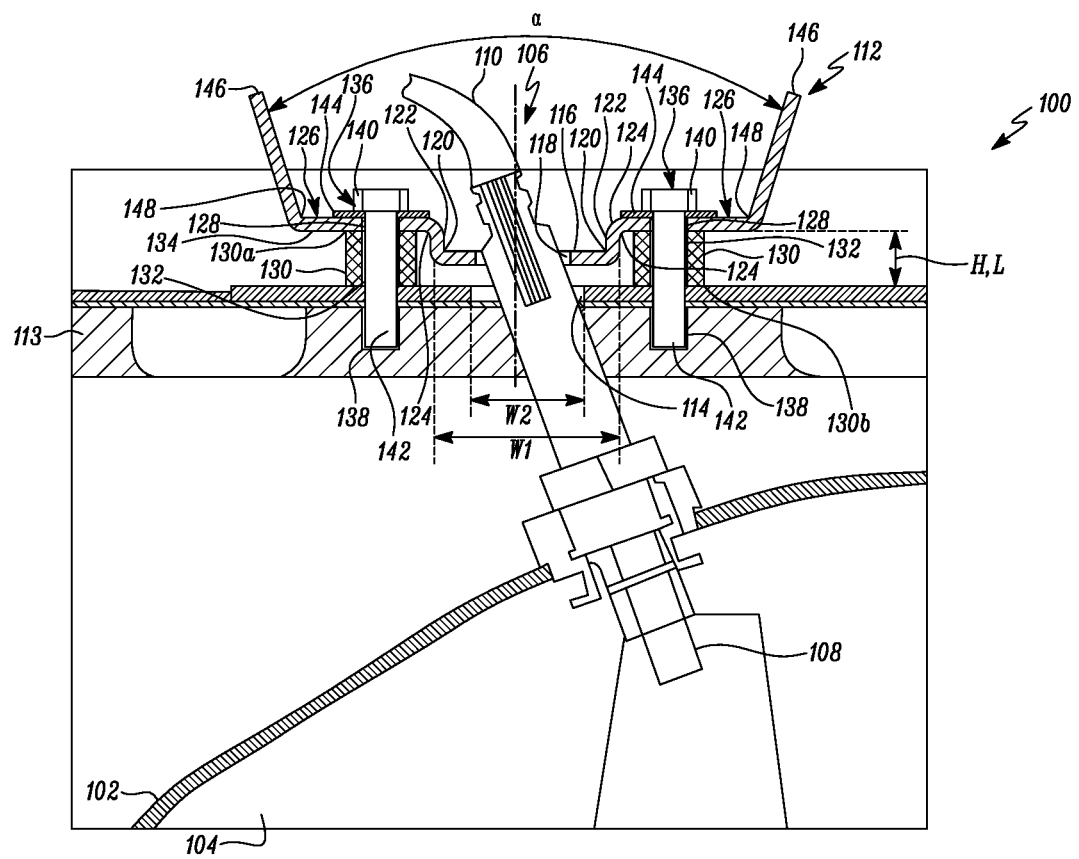
FIG. 2 is a front sectional view of the exhaust conduit and the exhaust sensor assembly taken along sectional line AA' of FIG. 1, according to an embodiment of the present disclosure.

With continued reference to FIG. 1 and as best shown in the view of FIG. 2, the engine 100 includes an exhaust conduit 102 that defines a passageway 104 therethrough. Upon combustion of a mixture of fuel and air within the engine 100, exhaust gases may be routed from the engine 100 to an aftertreatment system (not shown) and/or a turbocharger (not shown) via the passageway 104 of the exhaust conduit 102.

The engine 100 also includes an exhaust sensor assembly 106 that is associated with the exhaust conduit 102. As best shown in the view of FIG. 2, the exhaust sensor assembly 106 includes a sensor 108, a wire harness 110 that is associated with and extending from the sensor 108, and a heat shield assembly 112 disposed about the wire harness 110.

Figure 3:
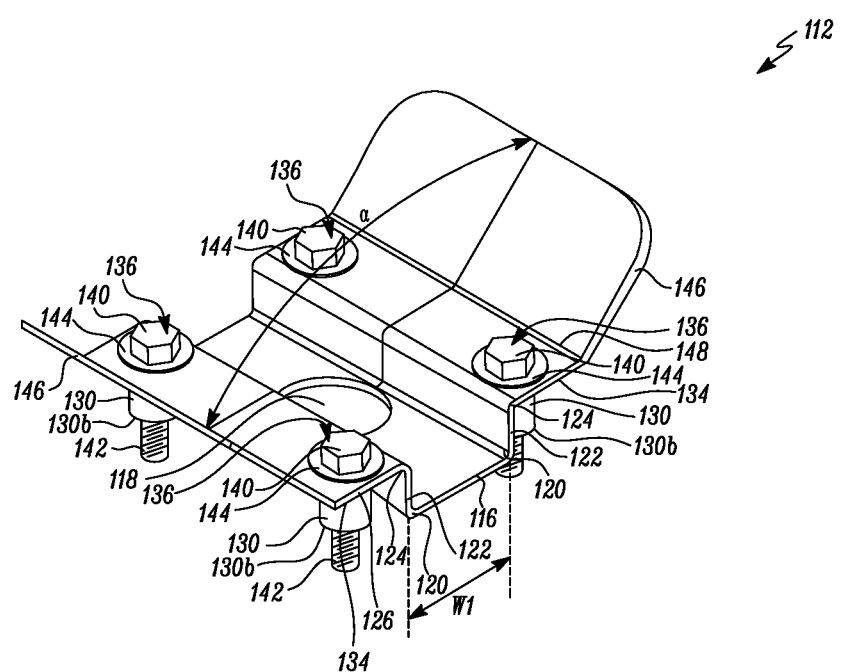
FIG. 3 is a zoomed-in top perspective view of the heat shield assembly, according to an embodiment of the present disclosure.
Figure 4:
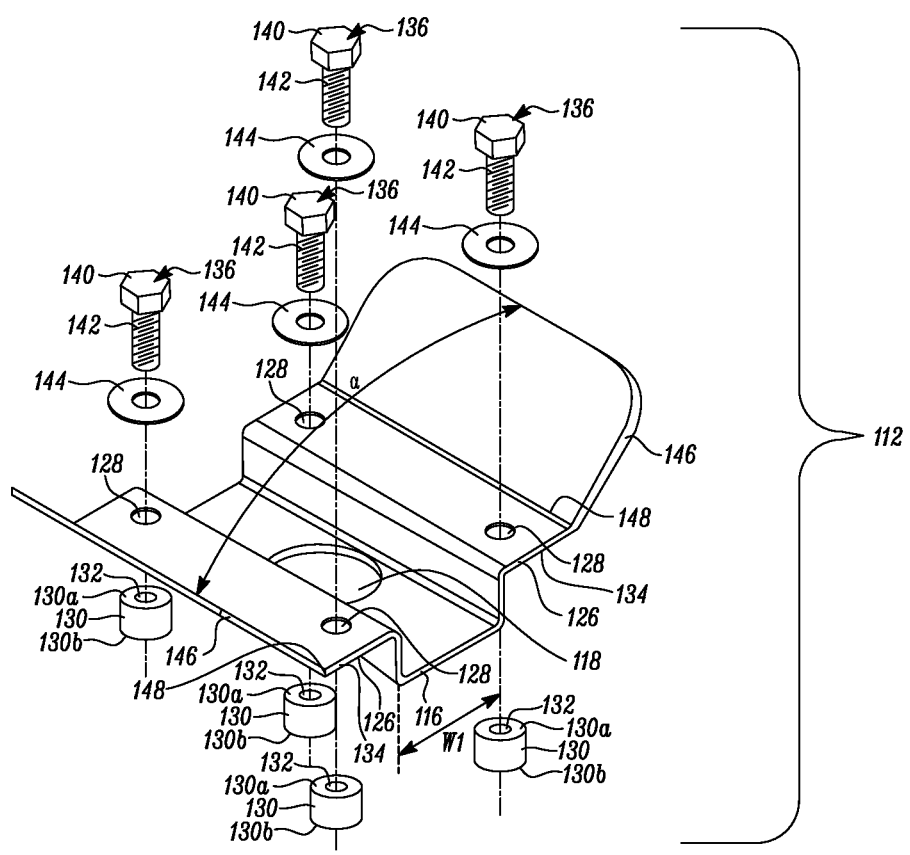
FIG. 4 is an exploded top perspective view of the heat shield assembly, according to an embodiment of the present disclosure.

Referring to the views of FIGS. 2 and 3, the sensor 108 is received, at least partly, within the passageway 104 of the exhaust conduit 102 via a hole 114 defined on a shroud 113 of the exhaust conduit 102. The sensor 108 is disposed in communication with the passageway 104. The wire harness 110 is disposed outwardly from the shroud 113 of the exhaust conduit 102. Referring to FIGS. 2-4, the heat shield assembly 112 includes a base plate 116. The base plate 116 has a primary aperture 118 that is configured for allowing passage of the wire harness 110 therethrough. The primary aperture 118 is disposed in alignment with the hole 114 defined on the shroud 113 of the exhaust conduit 102. In an embodiment herein, a width W1 of the base plate 116 is in the range of 0.75 to 1.25 times a width W2 of the hole 114 that is defined on the shroud 113 of the exhaust conduit 102. For example, in the illustrated embodiment of FIG. 2, the width of the base plate 116 may be 1.25 times the width of the hole 114 that is defined on the shroud 113 of the exhaust conduit 102.

Further, the heat shield assembly 112 also includes a pair of walls 122 extending upwardly from a pair of opposite edges 120 of the base plate 116. Therefore, in embodiments herein, it can be regarded that each wall 122 may be disposed at an angle not exceeding 90 degrees relative to the base plate 116. By extending the pair of walls 122 upwardly from the pair of opposite edges 120 of the base plate 116, it is hereby contemplated the pair of walls 122 are configured to provide an unobstructed flow path for heat that is radiated by shroud 113 of the exhaust conduit 102, upon conduction of such heat by the exhaust conduit 102 and the shroud 113 from the exhaust routed within the passageway 104 of the exhaust conduit 102.

Furthermore, the heat shield assembly 112 also includes a pair of ledge members 126 that extend laterally from a pair of first ends 124 associated with the pair of walls 122. In an embodiment, each ledge member 126 is configured to define at least one secondary aperture 128 therethrough. As shown best in the view of FIG. 4, each ledge member 126 is configured to define two secondary apertures 128 therethrough. Although two secondary apertures 128 are defined in each ledge member 126 as depicted in the view of FIG. 4, in other embodiments, fewer or more secondary apertures 128 may be defined on each ledge member 126 in lieu of the two secondary apertures 128 disclosed herein.

In a further embodiment, the heat shield assembly 112 also includes at least a pair of spacers 130. As best shown in the view of FIG. 4, four spacers 130 are associated with corresponding ones of the secondary apertures 128 from the pair of ledge members 126. Moreover, as shown best by way of FIGS. 2 and 4, each spacer 130 defines a passage 132 that is disposed in alignment with the secondary aperture 128 from a corresponding one of the ledge members 126. A first end 130a of the spacer 130 is disposed in abutment with an underside 134 of the corresponding ledge member 126 while a second end 130b of the spacer 130 is disposed in abutment with the shroud 113 of the exhaust conduit 102. In embodiments herein, each spacer 130 has a length L to help dispose the pair of ledge members 126 at a height H from the shroud 113 so that an air gap is defined between the base plate 116 and the shroud 113. Moreover, in embodiments herein, the spacers 130 may be made from a metal. In alternative embodiments, the spacers 130 may be made from a thermoplastic.

In a further embodiment, the heat shield assembly 112 also includes at least a pair of threaded fasteners 136. As best shown in the view of FIG. 4, four threaded fasteners 136 are shown associated with corresponding ones of the secondary apertures 128 from the pair of ledge members 126. Moreover, as best shown in the view of FIG. 2, each threaded fastener 136 is configured to pass through the secondary aperture 128 of a corresponding ledge member 126 and the passage 132 of a corresponding spacer 130 to releasably engage with the shroud 113 of the heat source for securing the heat shield assembly 112 to the shroud 113. As such, the shroud 113 of the exhaust conduit 102 is configured to define threaded receptacles 138 that correspond, in number, with a number of threaded fasteners 136 associated with the heat shield assembly 112. In an embodiment, these threaded fasteners 136 may include HEX bolts. As shown best in the view of FIG. 4, each HEX bolt has a head 140 and a threaded shank 142 axially extending therefrom.

In a further embodiment, the heat shield assembly 112 also includes at least a pair of washers 144. As best shown in the view of FIG. 4, four washers 144 are shown associated with corresponding ones of the secondary apertures 128 from the pair of ledge members 126. Moreover, as shown best in the view of FIG. 2, each washer 144 is disposed between the head 140 of the fastener 136 i.e., the HEX bolt and a corresponding one of the ledge members 126. The washer 144 is configured to prevent any inadvertent movement of the associated threaded fastener 136 with its corresponding threaded receptacle 138 defined on the shroud 113 of the exhaust conduit 102. In an embodiment herein, each of these washers 144 may include a Belleville washer, a wave washer, a split spring-lock washer or any other type of washer commonly known in the art to perform functions that are consistent with the present disclosure i.e., for preventing any inadvertent movement of the threaded fastener 136 with its corresponding threaded receptacle 138 defined on the shroud 113 of the exhaust conduit 102.

Furthermore, the heat shield assembly 112 also includes a pair of thermal diverter plates 146 that extend angularly from a pair of second ends 148 associated with the pair of ledge members 126. In an embodiment herein, the pair of thermal diverter plates 146 may be disposed at an angle α of 1-179 degrees from each other. Referring to the illustrated embodiment of FIG. 2, the pair of thermal diverter plates 146 may be disposed at an angle α of, for example, 34 degrees from each other. It will be appreciated that in embodiments herein, these thermal diverter plates 146 are positioned at the angle α relative to each other such that the thermal diverter plates 146 provide minimal restriction to the flow path of heat that is radiated by the shroud 113 of the exhaust conduit 102 while effectively deflecting the heat away from the wire harness 110 that is associated with the sensor 108.

INDUSTRIAL APPLICABILITY

The present disclosure has applicability for use and implementation in providing a heat shield assembly 112 for shielding a wire harness of a sensor by deflecting heat that is radiated from a heat source, such as an engine, away from the wire harness. Conventional heat shields have at least one intermediate wall or an intermediate portion of at least one wall that is angled relative to the flow path of heat radiated from the heat source. The angled intermediate wall, or the angled intermediate portion of the wall, of such conventional heat shields may provide an obstruction to the flow of heat thereby reducing the effectiveness in diverting the heat away from the sensor. Instead, the angled intermediate wall, or the angled intermediate portion of the wall, of such conventional heat shields may be exposed directly to heat radiated by the heat source thus making at least the wire harness of the sensor susceptible to failure.

In the heat shield assembly 112 of the present disclosure, the wall 122 extends upwardly from the edge 120 of the base plate 116 thereby posing as little obstruction as possible to a flow of heat that is radiated from the shroud 113 of the exhaust conduit 102. Consequently, the heat radiated from the shroud 113 of the exhaust conduit 102 is now fully and effectively deflected, by the thermal diverter plates 146, away from the wire harness 110 that is associated with the sensor 108. Moreover, by providing a tiered configuration to the base plate 116, the walls 122, and the ledge members 126 via the differential height of the base plate 116 in relation to the ledge members 126, the heat can be routed via a wider flow path between the ledge members 126 and the shroud 113 owing to the height H of the spacers 130. Therefore, with use of the heat shield assembly 112, the wire harness 110 may be subject to heat minimally thereby entailing a reduced possibility of failure of the wire harness 110 that is required for protecting a cable (not shown) associated with the sensor 108. As the heat shield assembly 112 of the present disclosure shields the wire harness 110 effectively from heat radiated by a heat source, a service life of the wire harness 110 is prolonged thereby requiring less frequent repair and/or maintenance of the wire harness 110.

Various embodiments disclosed herein are to be taken in the illustrative and explanatory sense and should in no way be construed as limiting of the present disclosure. All joinder references (e.g., associated, coupled, connected, secured, and the like) are only used to aid the reader's understanding of the present disclosure, and may not create limitations, particularly as to the position, orientation, or use of the components disclosed herein. Therefore, joinder references, if any, are to be construed broadly. Additionally, all positional terms, such as, but not limited to, "first", "second" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element relative to, or over, another element.

What is claimed is:

1. A heat shield assembly for shielding a wire harness associated with a sensor in communication with a heat source, the heat shield assembly comprising:
    a base plate having a primary aperture configured to allow passage of the wire harness therethrough, the primary aperture disposed in alignment with a hole defined on a shroud of the heat source;
    a pair of walls extending upwardly from a pair of opposite edges of the base plate;
    a pair of ledge members outwardly laterally extending from a pair of first ends associated with the pair of walls; and
    a pair of thermal diverter plates extending angularly upward and outwardly laterally from a pair of second ends associated with the pair of ledge members.

2. The heat shield assembly of claim 1, wherein each ledge member is configured to define at least one secondary aperture therethrough.

3. The heat shield assembly of claim 2 further comprising at least a pair of spacers, each spacer defining a passage disposed in alignment with the secondary aperture from a corresponding one of the ledge members, wherein an end of the spacer is disposed in abutment with an underside of the corresponding ledge member.

4. The heat shield assembly of claim 3 further comprising at least a pair of threaded fasteners, each threaded fastener configured to pass through the secondary aperture of a corresponding ledge member and the passage of a corresponding spacer to releasably engage with the shroud of the heat source for securing the heat shield to the shroud.

5. The heat shield assembly of claim 4, wherein the threaded fasteners include HEX bolts, each HEX bolt having a head and a threaded shank axially extending therefrom.

6. The heat shield assembly of claim 5 further comprising at least a pair of washers, each washer disposed between the head of the HEX bolt and a corresponding one of the ledge members.

7. The heat shield assembly of claim 1, wherein the pair of thermal diverter plates are disposed at an angle of 1-89 degrees relative to horizontal.

8. The heat shield assembly of claim 1, wherein a width of the base plate is in the range of 0.75 to 1.25 times a width of the hole defined on the shroud of the heat source.

9. An exhaust sensor assembly for an engine, the exhaust sensor assembly comprising:
a sensor received within a passageway of an exhaust conduit associated with the engine via a hole defined on a shroud of the exhaust conduit, the sensor disposed in communication with the passageway;
a wire harness associated with and extending from the sensor, the wire harness disposed outwardly from the shroud of the exhaust conduit; and
a heat shield assembly disposed about the wire harness, the heat shield assembly comprising:
a base plate having a primary aperture configured to allow passage of the wire harness therethrough, the primary aperture disposed in alignment with the hole defined on the shroud of the exhaust conduit, wherein a width of the base plate is in the range of 0.75 to 1.25 times a width of the hole defined on the shroud of the exhaust conduit;
a pair of walls extending upwardly from a pair of opposite edges of the base plate;
a pair of ledge members laterally extending from a pair of first ends associated with the pair of walls; and
a pair of thermal diverter plates extending angularly from a pair of second ends associated with the pair of ledge members,
wherein the heat shield assembly is adapted such that no portion of the base plate, the pair of walls, the pair of ledge members, and the pair of thermal diverters of the heat shield assembly contacts the shroud of the exhaust conduit.

10. The exhaust sensor assembly of claim 9, wherein each ledge member of the heat shield assembly is configured to define at least one secondary aperture therethrough.

11. The exhaust sensor assembly of claim 10, wherein the heat shield assembly further comprises at least a pair of spacers, each spacer defining a passage disposed in alignment with the secondary aperture from a corresponding one of the ledge members, wherein an end of the spacer is disposed in abutment with an underside of the corresponding ledge member.

12. The exhaust sensor assembly of claim 11, wherein the heat shield assembly further comprises at least a pair of threaded fasteners, each threaded fastener configured to pass through the secondary aperture of a corresponding ledge member and the passage of a corresponding spacer to releasably engage with the shroud of the heat source for securing the heat shield assembly to the shroud.

13. The exhaust sensor assembly of claim 12, wherein the threaded fasteners include HEX bolts, each HEX bolt having a head and a threaded shank axially extending therefrom.

14. The exhaust sensor assembly of claim 13, wherein the heat shield assembly further comprises at least a pair of washers, each washer disposed between the head of the HEX bolt and a corresponding one of the ledge members.

15. The exhaust sensor assembly of claim 9, wherein the pair of thermal diverter plates of the heat shield are disposed at an angle of 1-179 degrees from each other.

16. An engine comprising:
an exhaust conduit defining a passageway therethrough; and
an exhaust sensor assembly comprising:
a sensor received within the passageway of the exhaust conduit via a hole defined on a shroud of the exhaust conduit, the sensor disposed in communication with the passageway;
a wire harness associated with and extending from the sensor, the wire harness disposed outwardly from the shroud of the exhaust conduit; and
a heat shield assembly disposed about the wire harness, the heat shield assembly being provided entirely on a first side of the shroud of the exhaust conduit, outside of the exhaust conduit, and not on a second side of the shroud of the exhaust conduit opposite the first side, the heat shield assembly comprising:
a base plate having a primary aperture configured to allow passage of the wire harness therethrough, the primary aperture disposed in alignment with the hole defined on the shroud of the exhaust conduit, wherein a width of the base plate is in the range of 0.75 to 1.25 times a width of the hole defined on the shroud of the exhaust conduit;
a pair of walls extending upwardly from a pair of opposite edges of the base plate;
a pair of ledge members laterally extending from a pair of first ends associated with the pair of walls; and
a pair of thermal diverter plates extending angularly from a pair of second ends associated with the pair of ledge members.

17. The engine of claim 16, wherein each ledge member of the heat shield is configured to define at least one secondary aperture therethrough.

18. The engine of claim 17, wherein the heat shield assembly further comprises at least a pair of spacers, each spacer defining a passage disposed in alignment with the secondary aperture from a corresponding one of the ledge members, wherein an end of the spacer is disposed in abutment with an underside of the corresponding ledge member.

19. The engine of claim 18, wherein the heat shield assembly further comprises at least a pair of threaded fasteners, each threaded fastener configured to pass through the secondary aperture of a corresponding ledge member and the passage of a corresponding spacer to releasably engage with the shroud of the heat source for securing the heat shield to the shroud.

20. The engine of claim 16, wherein the pair of thermal diverter plates of the heat shield are disposed at an angle of 1-179 degrees from each other.

* * * * *